UNITED STATES PATENT OFFICE.

RICHARD KOTHE, OF VOHWINKEL, NEAR ELBERFELD, AND OSKAR DRESSEL, OF MÜLHEIM-ON-THE-RHINE, GERMANY, ASSIGNORS TO SYNTHETIC PATENTS CO. INC., OF NEW YORK, N. Y., A CORPORATION OF NEW YORK.

NITROSULFONYLCHLORIDS OF ORTHO-OXYCARBOXYLIC ACIDS AND OF THEIR DERIVATIVES.

1,125,124. Specification of Letters Patent. Patented Jan. 19, 1915.

No Drawing. Application filed May 12, 1914. Serial No. 838,094.

*To all whom it may concern:*

Be it known that we, RICHARD KOTHE and OSKAR DRESSEL, doctors of philosophy, chemists, citizens of the German Empire, residing at, respectively, Vohwinkel, near Elberfeld, and Mülheim-on-the-Rhine, Germany, have invented new and useful Improvements in Nitrosulfonylchlorids of Ortho-Oxycarboxylic Acids and of Their Derivatives, of which the following is a specification.

The present invention relates to the manufacture of valuable intermediate compounds for the production of dyestuffs and for the preparation of pharmaceutical products, which can be obtained by nitrating sulfonylchlorids of ortho-oxycarboxylic acid compounds, such as salicylic-para-sulfonylchlorid, meta-cresotinic-sulfonylchlorid, the sulfonylchlorid of the salicylic-methyl-ester, etc. These nitrosulfonylchlorids are generally colorless crystalline compounds, insoluble in water and generally soluble in ether, acetone, benzene, chloroform, ligroin and glacial acetic acid.

In order to illustrate the new process more fully the following example is given, the parts being by weight: 236.5 parts of salicylic acid-para-sulfonylchlorid are dissolved while being cooled in 1420 parts of anhydrous sulfuric acid and are nitrated at a temperature of from 0 to 10° C. with an acid consisting of 102 parts of nitric acid (40° Bé.) and 148 parts of anhydrous sulfuric acid. When the reaction is almost complete the nitroproduct separates for the most part. The light yellow colored pulp is still stirred for some time and then poured on ice. The nitrosulfonylchlorid is filtered off, washed with cold water and dried at a moderate temperature. This product is easily soluble in ether and acetone, difficultly soluble in benzene, ligroin and chloroform. It crystallizes from toluene and chlorobenzene in colorless needles melting at from 181 to 182° C. whereby a slow evolution of gas takes place. This product has most probably the formula:

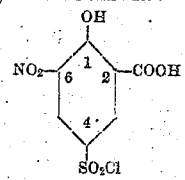

In an analogous manner other of the nitrosulfonylchlorids are obtained *e. g.* nitro-meta-cresotinic-sulfonylchlorid of the formula:

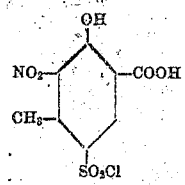

colorless crystals melting at from 217 to 218° C.; the nitrosulfonylchlorid of the salicylic-methylester of the formula:

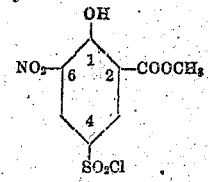

crystalline needles melting at from 132 to 133° C. Instead of the nitric acid mentioned in the example other nitrating agents such as salts of the nitric acid can be used.

We claim:—

1. The herein described nitrosulfonylchlorids of ortho-oxycarboxylic acid compounds, which are generally colorless crystalline compounds, insoluble in water and generally soluble in ether, acetone, benzene, chloroform, ligroin, glacial acetic acid and being valuable intermediate products for the production of dyestuffs and for the preparation of pharmaceutical compounds, substantially as described.

2. The herein described nitrosulfonylchlorids of salicylic acid compounds, which are generally colorless crystalline compounds, insoluble in water and generally soluble in ether, acetone, benzene, chloroform, ligroin, glacial acetic acid and being valuable intermediate products for the production of dyestuffs and for the preparation of pharmaceutical compounds, substantially as described.

3. The herein described nitro-salicylic-para-sulfonylchlorid having most probably the formula:

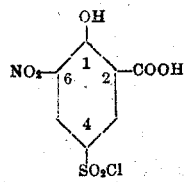

which crystallizes from toluene or chlorobenzene in colorless needles melting at from 181 to 182° C. being insoluble in water, easily soluble in ether and acetone, but difficultly soluble in benzene, ligroin and chloroform and having proved to be a valuable intermediate product for the preparation of dyestuffs and the production of pharmaceutical products, substantially as described.

In testimony whereof we have hereunto set our hands in the presence of two subscribing witnesses.

RICHARD KOTHE.
OSKAR DRESSEL.

Witnesses:
LOUIS VANDORN,
HANS BRÜKNER.